(No Model.)
J. T. EWAN.
MACHINE FOR SCOURING WHEAT &c.
No. 287,370. Patented Oct. 23, 1883.
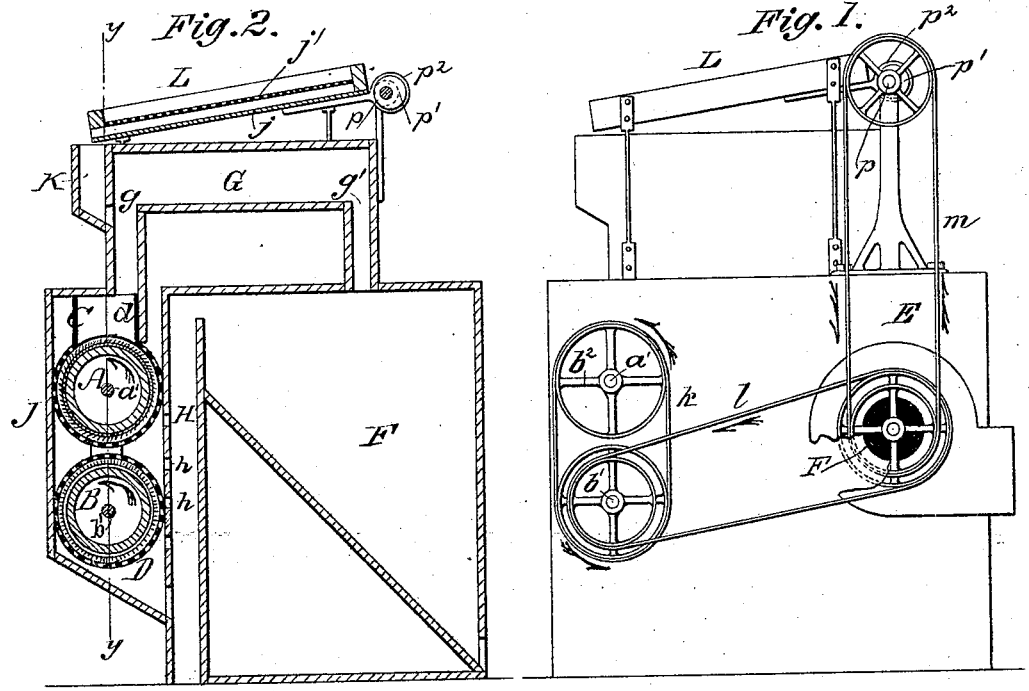
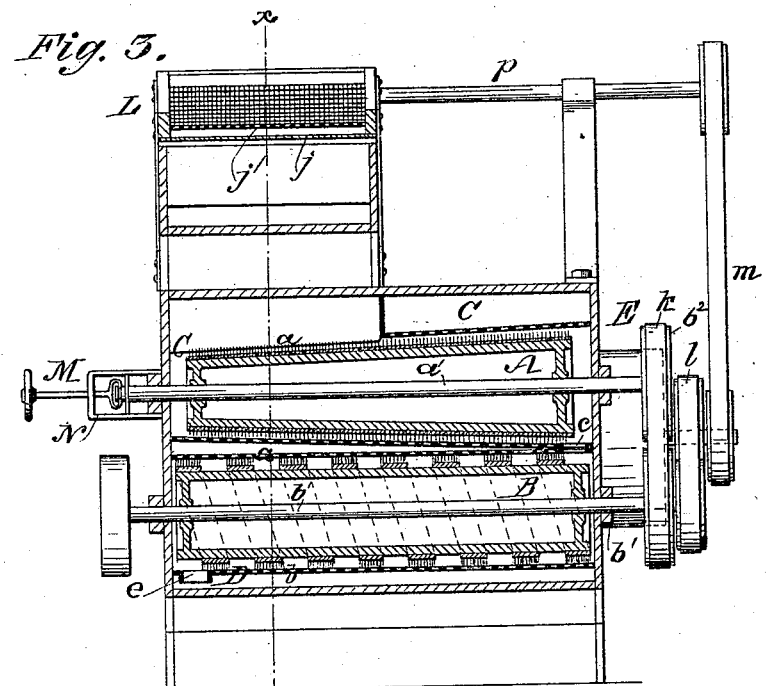
WITNESSES:
John R. Deemer
C. Sedgwick
INVENTOR:
J. T. Ewan
BY Munn & Co.
ATTORNEYS

UNITED STATES PATENT OFFICE.

JOHN T. EWAN, OF BETHALTO, ILLINOIS.

MACHINE FOR SCOURING WHEAT, &c.

SPECIFICATION forming part of Letters Patent No. 287,870, dated October 23, 1883.

Application filed June 19, 1883. (No model.)

*To all whom it may concern:*

Be it known that I, JOHN T. EWAN, of Bethalto, in the county of Madison and State of Illinois, have invented a new and Improved Machine for Scouring Wheat and other Grain, of which the following is a full, clear, and exact description.

The object of my invention is to provide a new and improved machine for scouring, brushing, and separating wheat and other grain preparatory to grinding; and the invention consists of the combination and construction of parts, substantially as hereinafter fully set forth and claimed.

Reference is to be had to the accompanying drawings, forming a part of this specification, in which similar letters of reference indicate corresponding parts in all the figures.

Figure 1 is a side elevation of my improved scouring-machine, with one side of the fan-box removed, and a portion of the latter broken away, showing its connection with the suction-chamber. Fig. 2 is a sectional elevation of the same, taken on the line $x\,x$ of Fig. 3. Fig. 3 is a sectional elevation taken on the line $y\,y$ of Fig. 2; and Fig. 4 is a detailed sectional elevation of one of the cylinders, showing the preferred form of scouring-teeth.

A represents the scouring-cylinder, and B represents the brushing-cylinder. These are surrounded by the perforated metal casings C D, and are journaled, one above the other, in the end compartment, J, of the main inclosure of the machine, and are covered with the wire teeth $a\,a$, that act upon the grain to scour, end, and brush it as the cylinders revolve in the casings C D.

The teeth may be secured directly to the cylinder, or to leather, canvas, or textile material $b$, applied so as to completely encompass the cylinders circumferentially, or it may be applied thereto in strips, and they (the teeth) may be arranged slantingly or straight, and may be beveled, blunt, or plain pointed.

The perforated casings C D are connected by small pipes or openings $c$, and the casing C receives the grain at $d$, and the grain is discharged at $e$, so that the grain is compelled to traverse the whole length of both the cylinders A B in its passage through the machine.

Before entering the casing C, and all the while during its passage through the machine, the grain is subjected to the action of a strong draft or current of air, which is maintained by the exhaust-fan E, and which separates and carries off the dust and other impurities mingled with and detached from the grain.

The fan E and main casing or inclosure of the machine may be variously arranged to maintain this current or draft of air through the grain as it enters the machine and while under treatment; but I prefer to construct the main inclosure so as to form the suction box or chamber F and passage, G and H, which put the box F in communication with the end compartment, J—the former through the short passages $g\,g'$, the latter through the series of holes $h\,h$—and to arrange the fan E to exhaust the air from the box F, the grain being fed to the perforated casing C from the receiving-chamber K, through the passage $g$, where it meets a continuous upward current of air, as will be understood from Fig. 2. The grain enters the receiving-chamber K from the inclined bottom $j$ of the shaking hopper L. Above this bottom $j$ is fitted in the hopper the screen $j'$, to which the grain is first fed, and which separates the straws, sticks, stones, and other coarse impurities from the grain before it enters the machine.

The cylinder A is by preference made conical, as shown in Fig. 3, and its shaft $a'$ is made of sufficient length and its pulley $b^2$ of sufficient width to permit the shaft $a'$ to be moved longitudinally in the machine for adjusting the cylinder A with respect to the casing C and openings $c$, for increasing or diminishing the space between the ends of the teeth $a$ and the casing C, thus regulating the violence with which the grain will be scoured and the speed at which it will be admitted to the action of cylinder; and in order that this cylinder A may be adjusted while the machine is in operation, I swivel to one end of the shaft $a'$ the rod M, which is supported by the yoke N, so that by drawing or pushing upon this rod the cylinder may be adjusted and the action of the machine regulated by the attendant without the trouble and delay of stopping the machine.

The shaft $b'$ of the brushing-cylinder B is the power-shaft of the machine, from which, through suitable pulleys and the belts $k\ l\ m$, motion is imparted to the scouring-cylinder A, fan E, and shaft $p$, which, through suitable eccentrics and connecting-plates, $p'\ p^2$, reciprocates the hopper L.

Having thus described my invention, I claim as new and desire to secure by Letters Patent—

The combination, with the suction box or chamber F, the end chamber, J, cylinders A B, one having an inclined surface, and the apertured casings C D, communicating with each other at one end, of the vertical passage H, communicating with the chambers F J, passage G, having downwardly-projecting draft-passages $g\ g'$, one communicating with the chamber J and the other connecting with the chamber F, and the receiving-chamber K, discharging into the tube $g$, substantially as and for the purpose set forth.

JOHN THOMAS EWAN.

Witnesses:
WM. L. PIGGOTT,
JACOB D. PIGGOTT.